Jan. 28, 1958     K. A. ANDERSON     2,821,305
BAG HOLDING MEANS
Filed April 27, 1955
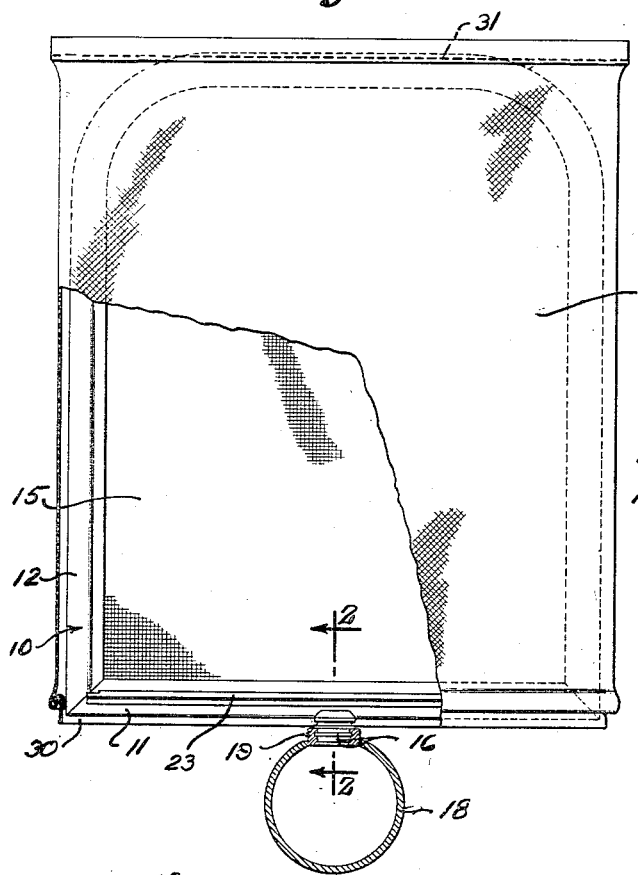
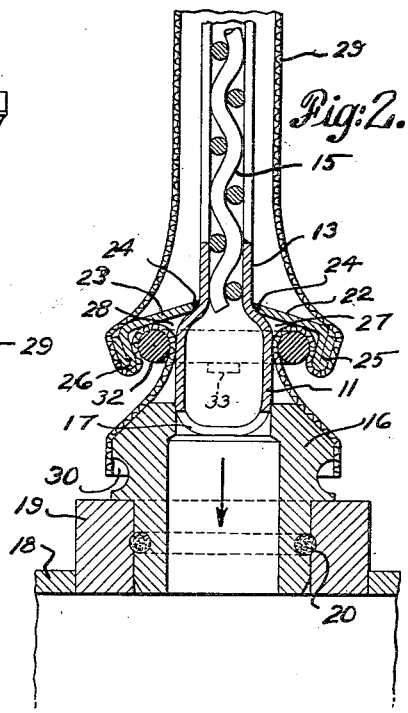
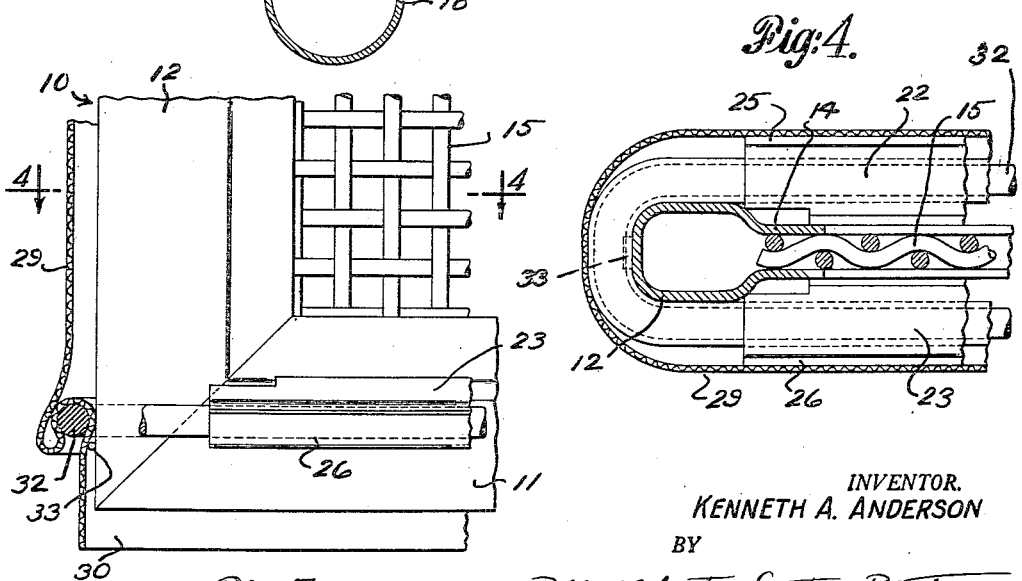
INVENTOR.
KENNETH A. ANDERSON
BY
Pollard Johnston Smythe & Robertson
ATTORNEYS

United States Patent Office 2,821,305
Patented Jan. 28, 1958

2,821,305

BAG HOLDING MEANS

Kenneth A. Anderson, Silvis, Ill., assignor to American Machine and Metals, Inc., New York, N. Y., a corporation of Delaware Application April 27, 1955, Serial No. 504,243

6 Claims. (Cl. 210—455)

The present invention relates generally to filters, and is particularly directed to improved means for securing a filter bag upon a pressure filter leaf.

In existing pressure filter apparatus, a series of filter leaves are removably mounted on a manifold within a closed housing, and the slurry of solids and liquids, from which the latter are to be removed, is introduced into such housing. Each filter leaf includes a hollow frame, in which screen spacers are mounted, and having a nozzle projecting from one side to be received in a corresponding receptacle on the manifold. A filter bag encloses the frame of each filter leaf so that the liquids to be filtered from the slurry pass through the filter bags and the screen spacers within the hollow frames, and then through the frame nozzles into the manifold which carries the liquids out of the closed housing, while the filter cake collects on the outer surfaces of the filter bags.

In the past, it has been the usual practice to provide a filter bag which is open at one end and provided with a reduced neck at its opposite end adapted to fit over the nozzle by which the frame of the related pressure filter leaf is mounted on the manifold. After such a filter bag has been disposed on the frame, the open end is folded over and sewed, or otherwise closed, to seal the bag on the filter frame. However, the provision of the filter bag with a neck at one end results in a relatively expensive construction and, in those cases where the open end of the filter bag is closed by sewing, the sewing operation is time consuming and complicates the procedures involved in replacing the filter bags. Further, in connection with the replacement of the filter bags, it is apparent that a filter bag having a neck at one end to fit over the nozzle of a filter frame can be removed from the latter, or fitted over the frame, only when the filter frame is disassembled from the manifold on which it is normally mounted by the nozzle.

Accordingly, it is an object of the invention to provide a filter leaf frame structure and a replaceable filter bag which can be positioned on the frame or removed from the latter, without disassembling the frame from the manifold supporting the several filter leaves, and wherein an improved arrangement removably closes and secures the filter bag upon the frame.

Another object is to provide means for securing and closing a filter bag upon the frame of the related pressure filter leaf so that, during operation of the filtering apparatus, any tendency of the filter bag to move off the frame, merely increases the tightness and security of the closure of the bag.

In one aspect of the invention, a filter leaf is provided having hollow framing members holding a spacer screen with a pipe coupling or nozzle extending from the framing member at one end of the leaf for mounting the leaf upon a related receptacle of the usual manifold. A flange extends outwardly along each of the opposite sides of the framing member at said one end of the filter leaf and is formed with a depending rim which converges, or is inclined, toward the adjacent side of the related framing member to define, with the latter, grooves opening through restricted spaces at the opposite sides of the framing member. The filter bag, being preferably of fabric, has one open end, the other end and side edges being permanently closed. The open end of the filter bag is adapted to be slipped over the filter leaf for enclosing the latter, with the open end portion of the bag extending over the framing member having the rimmed flanges extending therefrom. In order to secure the bag on the filter leaf, and to seal the open end of the bag, a resilient sealing ring is arranged around the open end portion of the filter bag below the rimmed flanges of the filter leaf, and is forced into the grooves past the restricted spaces defining the openings of the latter so that the open end portion of the bag is folded around the depending rims of the flanges. Further, the resilient sealing ring is preferably dimensioned so that it is constricted while located within the grooves with the fabric of the filter bag and thereby effectively seals the open end of the latter in relation to the filter leaf.

The above, and other objects, features and advantages of the invention will be apparent in the following detailed description of an illustrative embodiment which is to be read in connection with the accompanying drawing, wherein:

Fig. 1 is an elevational view of a filter bag, partly broken away and in section, mounted upon a pressure filter leaf in accordance with the present invention;

Fig. 2 is an enlarged sectional view taken along the line 2—2 of Fig. 1;

Fig. 3 is a fragmentary, detail view, on an enlarged scale, of a portion of the structure shown in Fig. 1; and Fig. 4 is a detail sectional view taken along the line 4—4 of Fig. 3.

Referring to the drawing in detail, it will be seen that a pressure filter leaf embodying this invention includes a frame, generally identified by the numeral 10, which is made up of a straight lower framing member 11, at one end of the leaf, and a U-shaped framing member 12 which is joined, at its ends, to the ends of framing member 11 and defines the sides and upper end of the leaf structure.

As seen in Figs. 2 and 4, the framing members 11 and 12 are hollow and open laterally inward between parallel, relatively close together extensions 13 and 14, respectively, extending along the inner edges of the framing members. A heavy gauge screen spacer 15 extends across the area defined by the frame 10 and is held, at its peripheral portions, between the extensions 13 and 14 of the framing members to which it is soldered, brazed or otherwise secured.

A nozzle or pipe coupling member 16 is secured, as by welding, to the outer or lower edge of the framing member 11 at a central location on the latter, and the framing member 11 has an opening 17 (Fig. 2) therein for communicating the interior of the hollow framing member 11 with the passage extending axially through the coupling 16.

As is the usual practice, the illustrated pressure filter leaf is intended to be mounted, along with other similar leaves, on a manifold 18 (Figs. 1 and 2) and, for this purpose, the manifold is provided with a spaced apart series of receptacles 19, each formed to receive the coupling 16 of the related filter leaf. The coupling 16 and the related receptacle 19 may be formed with circumferential grooves cooperating to receive any conventional sealing gasket, for example, an O-ring gasket 20, as shown in Fig. 2, which yieldably retains the coupling 16 within the related receptacle 19, to maintain the pressure filter leaf in operative position on the manifold, and also prevents the leakage of slurry into the manifold past the coupling 16.

The interiors of the hollow framing members 11 and 12 are in communication with each other at the ends of the lower framing member 11, and flanges 22 and 23 extend along the opposite sides of the framing member 11. The flanges 22 and 23 are joined at their inner edges to the framing member 11, for example, by welding 24 (Fig. 2), and the outer edge portions of the flanges are bent downwardly and then reverted upwardly to define depending rims 25 and 26 along the outer longitudinal edges of the flanges 22 and 23, respectively. As seen in Fig. 2, the flanges 22 and 23 incline downwardly from the framing member 11, while the rims 25 and 26 are perpendicular to the related flanges so that such rims converge downwardly with respect to the adjacent outer side surfaces of the framing member 11. Thus, the flanges 22 and 23, and the rims 25 and 26, together with the framing member 11 define grooves 27 and 28 at the opposite sides of framing member 11 opening in the direction of the mounted end of the filter leaf through restricted or narrowed spaces at the free edges of the rims.

In accordance with the present invention, a filter bag 29 adapted to fit over the above described filter leaf structure has its lower end completely open, as at 30, while the upper end of the bag is folded over and permanently closed, as by the stitching 31. After the bag 29 has been slipped downwardly over the filter leaf structure so that the closed, or upper, end of the bag rests upon the upper part of framing member 12, the open, or lower, end portion of the filter bag hangs over the framing member 11 and the rimmed flanges on the latter.

In order to close the lower end of the filter bag 29 and to secure the latter on the filter leaf, a continuous resilient band or ring 32, of natural or synthetic rubber, or the like, is circumferentially stretched and passed downwardly over the bag on the filter leaf until the band is disposed at a level below the lower edges of the rims 25 and 26 where it is released and contracts to draw the engaged parts of the filter bag laterally inward under the rims. Then the resilient band 32 is forced upwardly between the lower edges of the rims 25 and 26 and the sides of framing member 11 into the grooves 27 and 28 so that the lower portion of the filter bag is draped under the rims 25 and 26, at the opposite sides of the filter leaf, and over the band 32, as shown on Fig. 2. Preferably, the cross-section of the band 32 is such that the band is compressed within the grooves 27 and 28, whereby the lower portion of the filter bag is urged into sealing engagement with the inner surfaces of the rims 25 and 26 and with the outer side surfaces of the framing member 11 within the grooves. Since the resilient band 32 is compressed within the grooves 27 and 28, it is apparent that it will be further compressed in being withdrawn from such grooves past the lower edges of the rims 25 and 26, so that inadverent removal of the band from its lodged position within the grooves will be prevented.

It will be seen that the flanges 22 and 23 terminate adjacent the ends of framing member 11 (Figs. 1, 3 and 4), and that there is no continuation of the grooves 27 and 28 around the ends of framing member 12. Thus, as seen in Figs. 3 and 4, the resilient band 32 passes freely around the ends of the framing member 12 when the band is lodged in the grooves 27 and 28, and a free fold is formed in the lower portion of the filter bag 29 at the outer side of the band 32 (Fig. 3) over which the bag is draped so that the bag is urged into sealing engagement with the lower ends of the framing member 12 by the free portions of the resilient band. In order to prevent inadvertent downward movement of the free portions of band 32 along the lower end portions of framing member 12, a projection 33 (Figs. 2, 3 and 4), which may be in the form of a short section of rod, is welded, or otherwise secured, to each of the lower end portions of framing member 12 at a level immediately below the level of the band 32 when the latter is received in the grooves 27 and 28. Thus, the lower portion of the filter bag is gripped between the free portions of the band 32 and the projections 33, and the latter resist downward movement of the free portions of the band until the latter is stretched away from the lower end portions of framing member 12.

When a filter bag 29 is to be removed from the described filter leaf structure, the free or exposed portions of the band 32 are grasped and pulled outwardly and downwardly with sufficient force to release the band from the grooves 27 and 28. Then, the resilient band 32 is stretched circumferentially, to clear the flanges 22 and 23, and lifted off the filter bag, whereupon the latter is free to be slipped upwardly off the filter leaf. It is apparent that, both during the placement of a filter bag upon the filter leaf and the removal of a filter bag from the filter leaf, the filter leaf can remain in its mounted position on the manifold 18. Further, when a filter bag is being placed upon the filter leaf, the bag can be released to hang freely from the upper end while the resilient band 32 is being manipulated to its operative position where it secures the bag on the filter leaf and closes or seals the lower, open end of the bag in relation to the frame of the filter leaf, so that even large and normally unwieldly filter bags can be conveniently handled.

A further advantage of the described arrangement for securing and sealing the bag 29 on the filter leaf resides in the fact that the portion of the bag gripped by the band 32 within the grooves 27 and 28 is reversed in relation to the main part of the bag extending upwardly from the rims 25 and 26 so that the force of any upward pull on the bag is dissipated, at least to some extent, by the friction between the rims and the parts of the bag folded under the rims, and the force tending to remove the band 32 from the grooves 27 and 28 is thereby reduced.

As is usual, the manifold 18 is disposed in a closed housing (not shown) into which the slurry of solids and liquids to be separated is introduced. When pressure is applied within the housing, the liquids of the slurry pass through each filter bag into the space enclosed by the bag and containing the screen spacer 15. From such space, the separated or filtered liquids pass through the hollow frame 10, and its coupling 16 into the manifold 18, by which the filtered liquids are removed from the housing. By reason of the secure seal provided at the lower, open end of the bag 29, in accordance with this invention, and the gasket 20 between the coupling 16 and its receptacle 19 on the manifold, there is no possibility that the liquids, after being filtered from the slurry, will again be contaminated by the solid phase of the slurry.

Although an illustrative embodiment of the invention has been described in detail herein and shown in the accompanying drawing, it is to be noted that the invention is not limited to the precise structure of that embodiment, and that various changes and modifications may be effected in the latter without departing from the scope or spirit of the invention, except as defined in the appended claims.

What is claimed is:

1. In a pressure filter leaf including hollow framing members and a spacing screen formed by said members, one end of said leaf having a pipe connection extending therefrom and leading to the inside of said members; the combination of a pliable fabric filter bag having one open end adapted to be slipped over said leaf so that the open end portion of said bag extends over said one end of the leaf, means on the opposite sides of said one end of the leaf defining grooves extending along said one end of the leaf and opening generally parallel to the plane of the leaf and in the direction of said one end of the latter, and a rubber-like band adapted to engage over said open end portion of the filter bag and to be forced in a plane generally parallel of the leaf, with the engaged fabric of the bag, into said grooves to cause sealing engagement of said bag with said leaf.

2. In a pressure filter leaf including hollow framing members and a spacing screen framed by said members, one end of said leaf having a pipe connection extending therefrom and leading to the inside of said members; the combination of a pliable fabric filter bag having one open end adapted to be slipped over said leaf so that the open end portion of said bag extends over said one end of the leaf, means on the opposite sides of said one end of the leaf defining grooves extending along said one end of the leaf and opening through restricted spaces along their lengths in the direction of said one end of the leaf generally parallel to the plane of said leaf, and a rubber-like band adapted to encircle said open end portion of the bag and to be forced, with the engaged fabric of the bag, through said restricted spaces into said grooves to cause sealing engagement of said bag with said leaf.

3. In a pressure filter leaf including hollow framing members and a spacing screen framed by said members, one end of said leaf having a pipe connection extending therefrom and leading to the inside of said members; the combination of a pliable fabric filter bag having one open end adapted to be slipped over said leaf so that the open end portion of said bag extends over said one end of the leaf, flanges extending along the opposite sides of said one end of the leaf and projecting laterally from the latter, rims depending from the outer edges of said flanges so that said rims and flanges, with said one end of the leaf, define grooves opening along their length in the direction of said one end of the leaf and generally parallel to the plane of the latter, and a rubber-like band adapted to encircle said open end portion of the bag and to be forced, with the engaged fabric of the bag, into said grooves to cause sealing engagement of said bag with said leaf.

4. In a pressure filter leaf including hollow framing members and a spacing screen framed by said members, one end of said leaf having a pipe connection extending therefrom and leading to the inside of said members; the combination of a pliable fabric filter bag having one open end adapted to be slipped over said leaf so that the open end portion of said bag extends over said one end of the leaf, flanges extending along the opposite sides of said one end of the leaf and projecting laterally from the latter, rims depending from the outer edges of said flanges and converging toward said one end of the leaf so that said rims and flanges, with said one end of the leaf, define grooves opening along their length through restricted spaces in the direction of said one end of the leaf and generally parallel to the plane of the latter, and a rubber-like band adapted to encircle said open end portion of the filter bag and to be forced, with the engaged fabric of the bag, through said restricted spaces into said grooves to cause sealing engagement of said bag with said leaf.

5. In combination with a pressure filter leaf having hollow members framing a spacing screen and a pipe connection extending from the lower end of the leaf and communicating with the interiors of said members; a pliable fabric filter bag open across its lower end to slip downwardly over and enclose said leaf, flanges extending along the opposite sides of said lower end of the leaf and directed laterally outward from the latter, rims depending from the outer edges of said flanges to define, with the latter and with the sides of said leaf, grooves extending along the lower end of said leaf and opening downwardly at the opposite sides of the latter, said rims converging downwardly so that said grooves open through restricted spaces, and an elastic band adapted to encircle said bag at a level below said rims and to be forced upwardly, with engaged parts of said bag, through said restricted spaces into said grooves where said band is constricted so that the lower portion of the bag is turned under said rims and then draped over said band within the grooves to cause sealing engagement of the bag with the sides of said leaf and the inner surfaces of said rims within said grooves.

6. In combination with a pressure filter leaf having hollow members framing a spacing screen and a pipe connection extending from the lower end of the leaf and communicating with the interiors of said members; a pliable fabric filter bag open across its lower end to slip downwardly over and enclose said leaf, means at the opposite surfaces of said leaf defining grooves extending along said lower end and opening downwardly as well as adjacent the opposite side edges of the leaf, and a rubber-like band adapted to encircle the lower portion of said bag enclosing the leaf and to be forced upwardly, with engaged parts of said bag, into said grooves to cause sealing engagement of said bag with said leaf, while the portions of the band extending around said side edges of the leaf are exposed and, therefore, can be grasped to effect removal of the band from said grooves.

References Cited in the file of this patent

UNITED STATES PATENTS

| | | |
|---|---|---|
| 2,063,086 | Fitz Gerald | Dec. 8, 1936 |
| 2,399,784 | Bergman | May 7, 1946 |
| 2,418,247 | Dalzell | Apr. 1, 1947 |
| 2,656,939 | De Vries | Oct. 27, 1953 |